United States Patent [19]

Nishioka

[11] Patent Number: 5,083,230
[45] Date of Patent: Jan. 21, 1992

[54] ACCESS MECHANISM FOR MAGNETIC DISK APPARATUS

[75] Inventor: Syoji Nishioka, Fujinomiya, Japan

[73] Assignee: Kabushiki Kaisha Toshiba, Kawasaki, Japan

[21] Appl. No.: 602,934

[22] Filed: Oct. 25, 1990

Related U.S. Application Data

[63] Continuation of Ser. No. 8,169, Jan. 29, 1987, abandoned.

[30] Foreign Application Priority Data

Jan. 31, 1986 [JP] Japan .................. 61-18143

[51] Int. Cl.$^5$ .................. G11B 5/55; G11B 21/08
[52] U.S. Cl. .................. 360/78.04; 360/75; 360/78.13; 369/32; 318/685; 318/696
[58] Field of Search ......... 360/75, 77.02, 77.06–77.11, 360/78.04, 78.08, 78.12–78.14, 77.03–77.05; 369/32, 33, 41; 318/685, 696

[56] References Cited

U.S. PATENT DOCUMENTS 4,122,503 10/1978 Allan .................. 360/78
4,149,199 4/1979 Chick et al. .................. 360/77.04

OTHER PUBLICATIONS

IBM TDB, vol. 19, No. 4, Porter et al., 9/76, pp. 1393–1395.

Primary Examiner—A. Heinz
Assistant Examiner—Steven R. Garland
Attorney, Agent, or Firm—Finnegan, Henderson, Farabow, Garrett, and Dunner

[57] ABSTRACT

A disk recording/reproducing apparatus is provided with a reference-point detection capability, including a device for stopping a carriage at an originating point. A control section supplies pulses to a carriage driving portion to move a carriage on which a recording/reproducing head is mounted. When the reference position detection section detects that the carriage has reached the originating point stopping device, the number of carriage-driving pulses expended is automatically stored in a memory in the form of position information. The control section uses an adjustment disk for positioning the recording/reproduction head and storing the position data. The control section further supplies the required number of pulses to move the carriage driving section to an Nth track on the adjustment disk. When the carriage reaches the Nth track, the control section again stores the number of carriage-driving pulses expended. As a result, the memory contains the physical originating-point information, and the centered-position information corresponding to the Nth track on the adjustment disk. The control section thus operates to subtract the physical originating point information from the centered-position information of the Nth track when the unit is energized, thereby moving the carriage to the designated track by using the subtracted difference.

5 Claims, 5 Drawing Sheets

Nth TRACK

ACCESS MECHANISM FOR MAGNETIC DISK APPARATUS

This application is a continuation of application Ser. No. 07/008169, filed Jan. 29, 1989 now abandoned.

BACKGROUND OF THE INVENTION

The present invention relates to a disk recording/reproduction apparatus for recording or reproducing data in or from a recording disk by using a movable recording/reproduction head and, more particularly, to a positioning mechanism of a recording/reproduction head.

A disk recording/reproduction apparatus, such as a magnetic, floppy, or optical disk apparatus, records or reproduces data on recording disks by using a movable recording/reproduction head.

The following two conventional positioning methods are employed in a disk recording/reproduction apparatus of this type in order to move a recording/reproduction head to an arbitrary position on a recording disk.

According to the first method, the rotation angle of a stepping motor used as a moving mechanism of a recording/reproduction head is set in one-to-one correspondence with a shift amount of the recording/reproduction head moved by the motor. A predetermined rotation angle is supplied to the motor in order to move the recording/reproduction head to an arbitrary position on a recording disk.

According to the second method, servo data as position data of each track of a recording disk is written in advance in either surface on the disk. Position data of a servo head which moves integrally with a recording-/reproduction head is obtained in order to move the recording/reproduction head to an arbitrary position on the recording disk.

With the first method, however, although the recording/reproduction head can be positioned with a simple configuration, the rotation angle of the motor is related only to the shift amount of the recording/reproduction head, and not to a predetermined track of the recording disk. Assume that the head is located between two adjacent tracks before positional adjustment of the head. In this case, even when the recording/reproduction head is moved, it is located between two adjacent tracks, and not at a central portion of a track. Therefore, in order to obtain correspondence with a predetermined track, the head must be correctly adjusted and fixed at a track position on an adjustment disk in which track position data is correctly written. For example, a position adjustment pattern as shown in FIG. 1 is writtc in advance in an Nth track of the adjustment disk. An instruction is supplied from host computer 5 connected to floppy disk drive (FDD) 7 to read the Nth track, as shown in FIG. 2. FDD 7 moves recording/reproduction head 3 to the Nth track, reproduces the waveform recorded in the Nth track, and displays it (indicated by dotted line) on display unit 9. A person adjusting disk drive 7 observes the displayed waveform and positions head 3 so that head 3 is positioned at the correct central portion (indicated by a solid line) of the Nth track. However, such a position adjustment operation for the head moving mechanism is very complicated and thus cumbersome.

With the second method, in addition to the disk and the head for data recording/reproduction, a disk in which servo data is written, a head for reading out the servo data, a circuit for decoding the servo data, and so on are required, resulting in a complicated disk recording apparatus.

SUMMARY OF THE INVENTION

It is an object of the present invention to provide a disk recording/reproduction apparatus having a recording/reproduction head positioning mechanism which can easily perform position adjustment of a head moving mechanism with a simple configuration.

In order to achieve the above object, according to the present invention, there is provided a disk recording/reproduction apparatus for recording data on a disk and reproducing data from said disk by causing the number of pulses supplied to a motor to correspond to a shift amount of a recording/reproduction head moved by said motor in one-to-one correspondence, and by moving said recording/reproduction head to an arbitrary position on a recording disk by supplying a predetermined number of pulses to said motor, comprising a carriage to which said recording/reproduction head is mounted, a carriage driving section for driving said carriage, storage means for storing the number of pulses supplied to said carriage driving section, an originating-point detecting section for detecting an originating point of said carriage, and control means which supplies the pulses to said carriage driving section in order to move said carriage to said originating-point detecting section, stores a first number of pulses which has been supplied to said carriage driving section in said storage means when said carriage has reached said originating-point detecting section, and uses an adjustment disk used for positioning of said recording/reproduction head and storing track position data, so that said control means supplies the number of pulses to said carriage driving section in order to move said carriage driving section to an Nth track on said adjustment disk, when it is detected that said carriage has reached the Nth track, stores a second number of pulses which has been supplied to said carriage driving section, moves said carriage to said originating-point detecting section as needed, and positions said carriage at the specified track by using a subtraction result between the second and first number of pulses.

BRIEF DESCRIPTION OF THE DRAWINGS

Other objects and features of the present invention will be apparent from the following description taken in connection with the accompanied drawings in which.

DETAILED DESCRIPTION OF THE PREFERRED EMBODIMENTS

Figure 3:
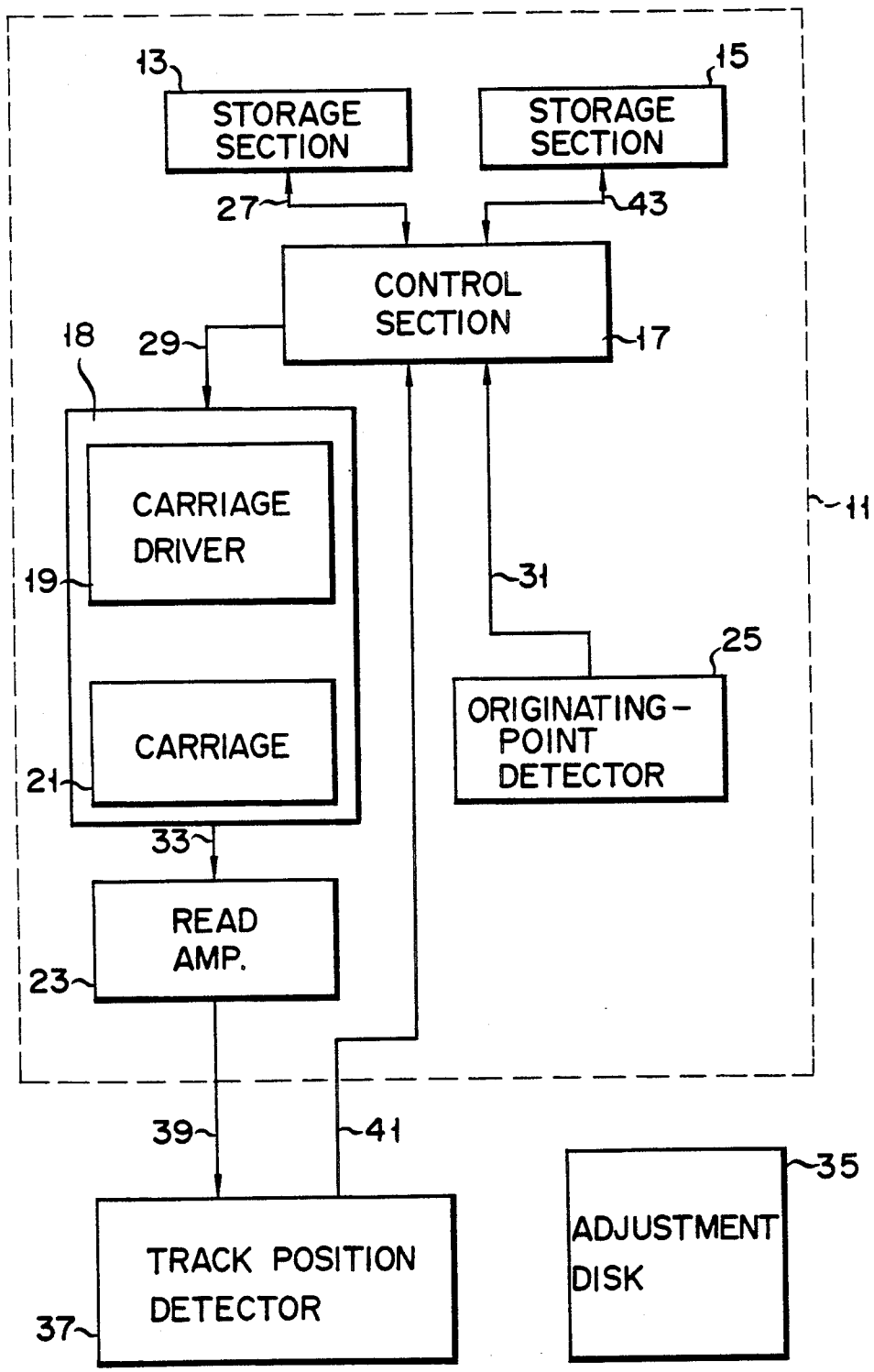
FIG. 3 is a block diagram of an embodiment of the present invention which is applied to a floppy disk drive.
Figure 4:
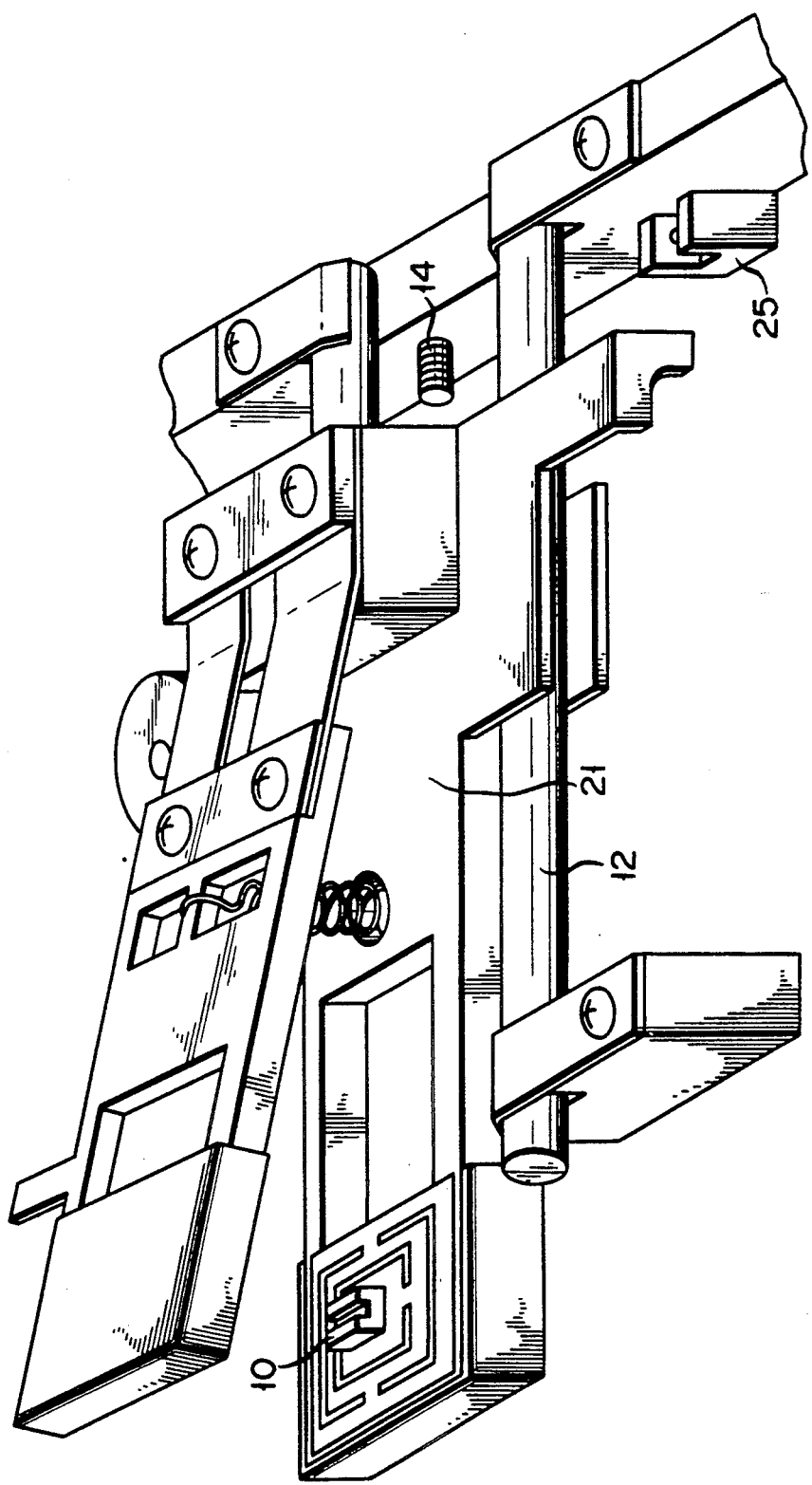
FIG. 4 is a perspective view showing an arrangement of a head, a carriage, an originating-point detecting stopper, and an originating-point detector.

FIG. 3 is a block diagram of an embodiment of the present invention which is applied to a floppy disk drive (to be referred to as an FDD hereinafter), and FIG. 4 is a perspective view showing an arrangement of a head, a carriage, an originating-point detecting stopper, and an originating-point detector.

FDD main body 11 has storage sections 13 and 15, control section 17, moving mechanism 18 comprising carriage driver 19 and carriage 21, read amplifier 23, and reference position detector 25. Control section 17 comprises, e.g., a microcomputer (e.g., 8085 available from Intel, U.S.A.). Control section 17 calculates position data of a target position of a recording/reproduction head from a drive amount of a head drive mechanism and an adjustment disk, to be described later, and supplies obtained position data to the head drive mechanism as a drive instruction. Storage section 13 stores a control program of control section 17. Control section 17 and storage section 13 are connected via data bus 27. Carriage driver 19 has a stepping motor to move carriage 21 along guide rail 12, in response to a drive or speed instruction supplied from control section 17 via signal line 29. A recording/reproduction head 10 is mounted on carriage 21. Furthermore, carriage 21 is provided with originating-point detecting stopper 14 and originating-point detector 25. When carriage 21 reaches the stopper 14, detector 25 supplies an interrupt signal to control section 17 via signal line 31. Detector 25 can comprise, e.g., a photosensor. A reproduction signal supplied from the recording/reproduction head 10 mounted on carriage 21 is supplied to read amplifier 23 via signal line 33 and is amplified. Adjustment disk 35 has position data on its Nth track, and is detachably mounted on FDD main body 11. Track position detector 37 is detachably provided in FDD main body 11 and detects position data written in adjustment disk 35. Detector 37 receives a reproduction signal, amplified by amplifier 23, via signal line 39, and supplies detected position data to control section 17 via signal line 41. Storage section 15 is connected to control section 17 via data bus 43 and stores carriage position data.

Figure 5:
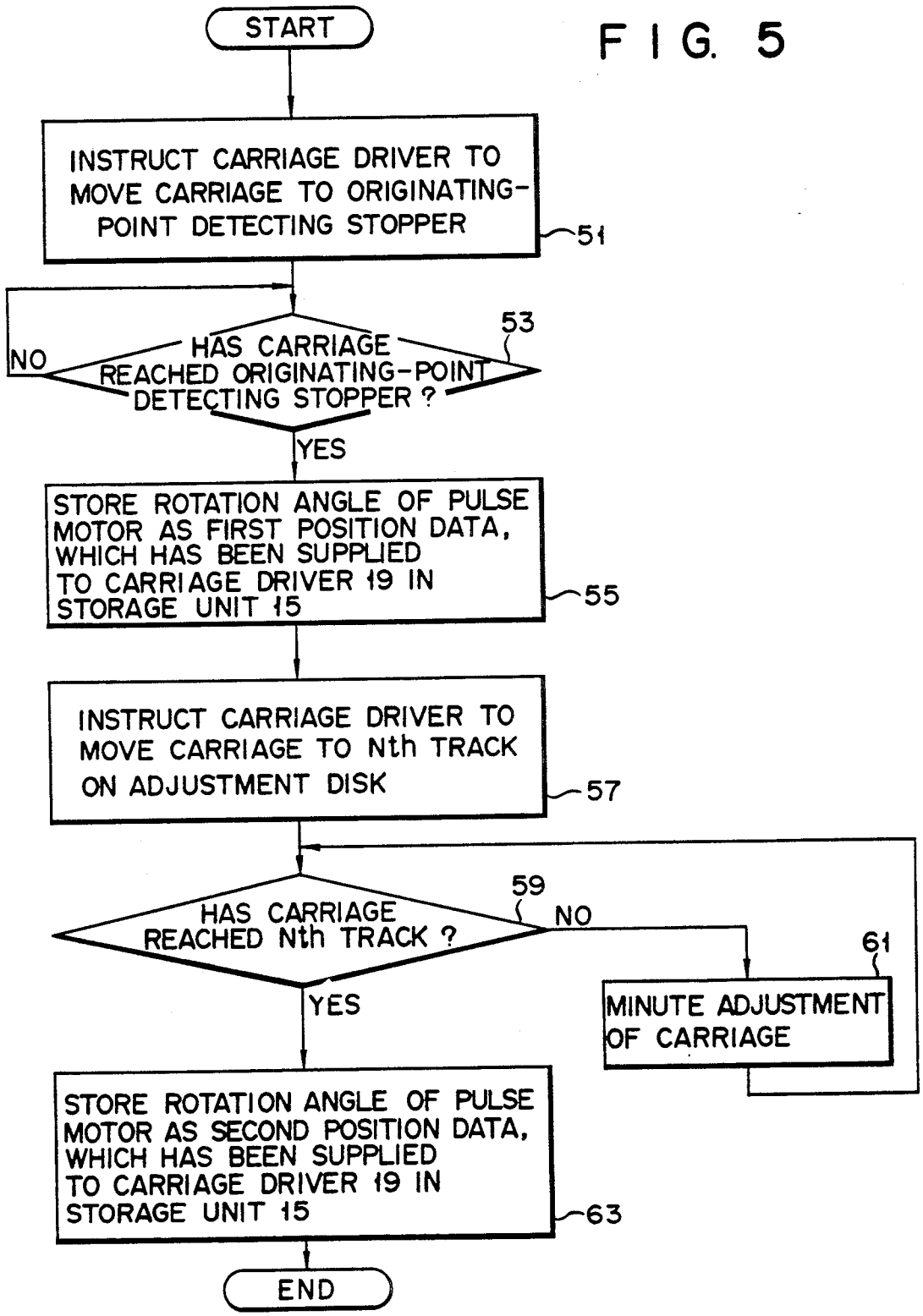
FIG. 5 is a flow chart for explaining a position adjustment of a recording/reproduction head.
Figure 6:
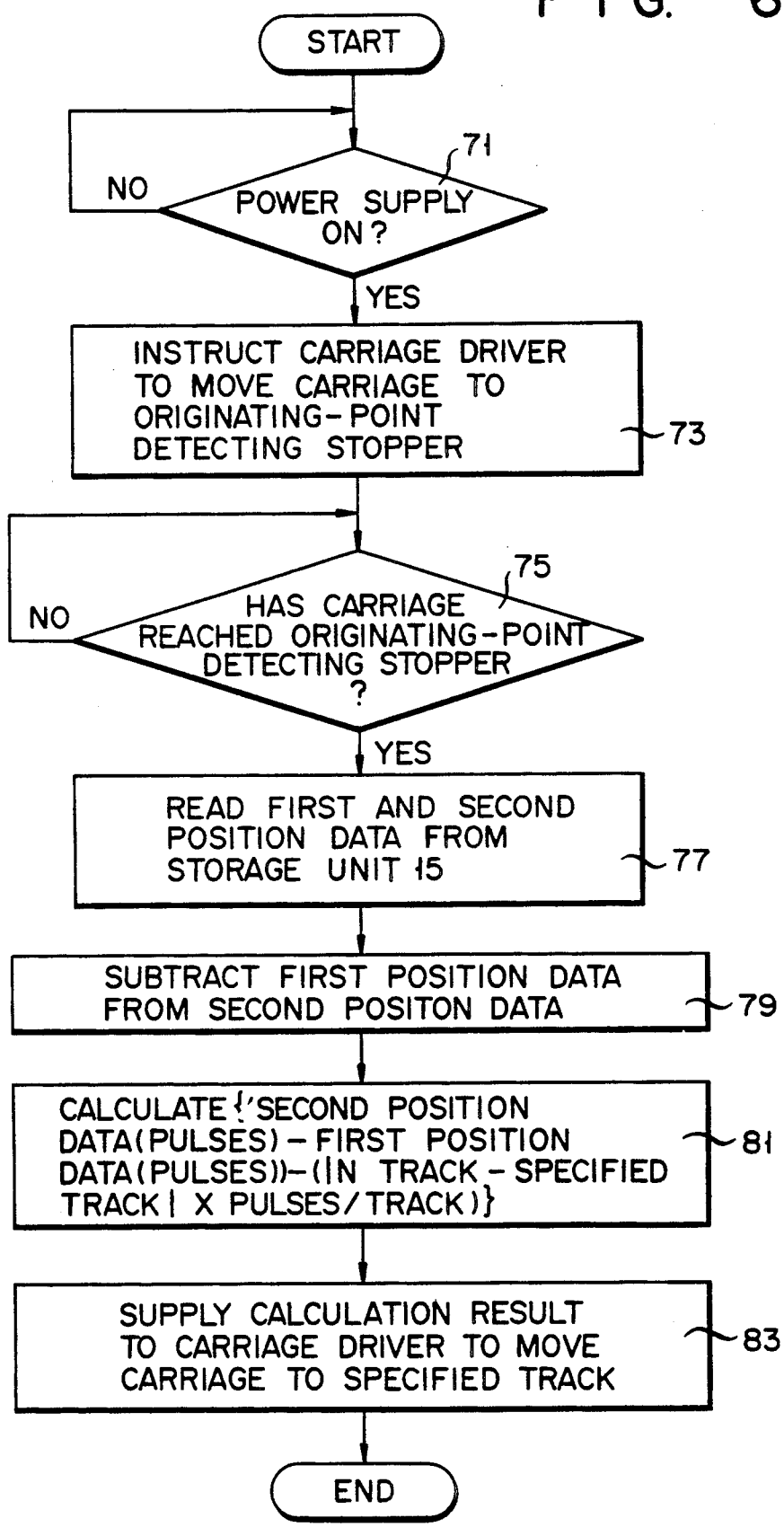
FIG. 6 is a flow chart for explaining accessing to a specified track of a disk after the position adjustment of a recording/reproduction head has been completed.

An embodiment of the present invention will be described with reference to the flow charts shown in FIGS. 5 and 6.

Control section 17 reads out an adjustment program prestored in storage section 13 via data bus 27, and performs position adjustment of the recording/reproduction head 10.

In step 51, control section 17 instructs carriage driver 19 to move carriage 21 to stopper 14 in order to search the physical originating point of carriage 21. Driver 19 receives the instruction from control section 17 and moves carriage 21 to stopper 14. When carriage 21 reaches stopper 14 (step 53), originating-point detector 25 detects arrival of carriage 21, and supplies an interrupt signal to control section 17 via signal line 31. In response to the interrupt signal, control section 17 stores first position data (rotation angle of the pulse motor, or the number of pulses supplied to the pulse motor), which has been supplied to driver 19, in storage section 15 (step 55).

In step 57, control section 17 instructs driver 19 to move carriage 21 to the Nth track on disk 35. Driver 19 follows the instruction from control section 17, and moves carriage 21 toward the Nth track on disk 35.

Figure 1:
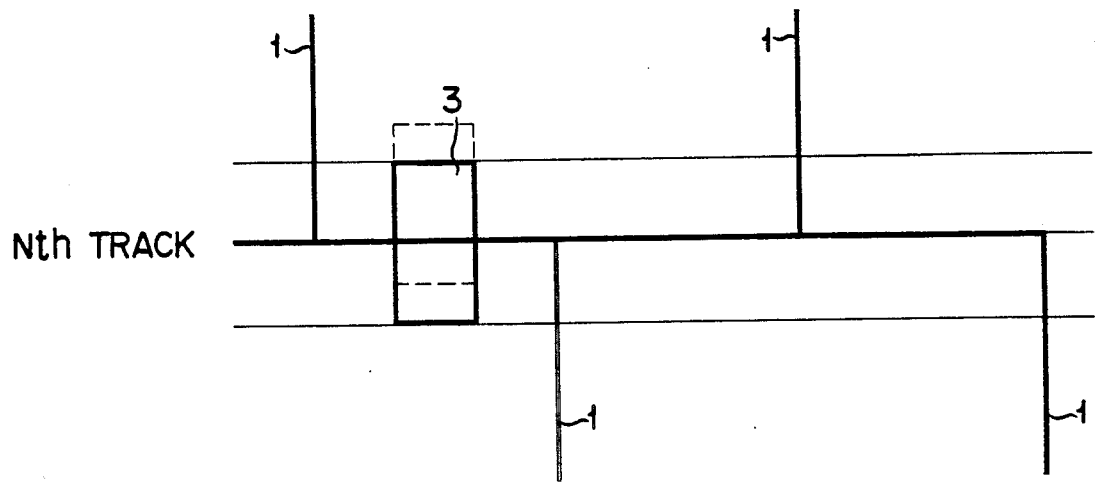
FIG. 1 is a view showing a waveform of data recorded on a conventional adjustment disk, and a relationship between a head and a track.
Figure 2:
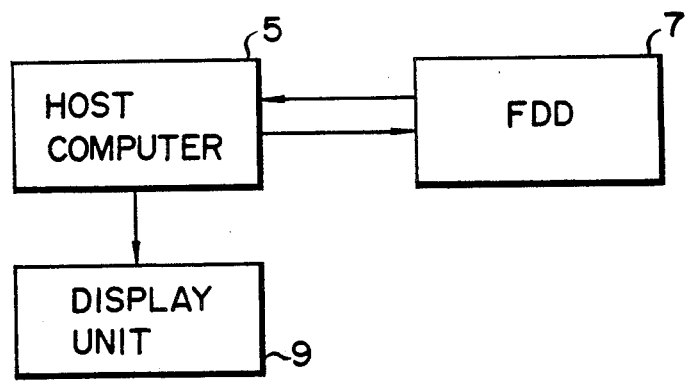
FIG. 2 shows a configuration of a system for performing conventional head position adjustment operation.

While carriage 21 moves above disk 35, position detector 37 monitors data supplied from disk 35 via the recording/reproduction head of carriage, 21, line 33, amplifier 23, and line 39. Preliminary position data has been written on the Nth track of disk 35. When the head 10 approaches the Nth track, analog data is supplied to position detector 37 via line 33, amplifier 23, and line 39. Preliminary data for positioning the head 10 at the central position of the Nth track has been written in the Nth track of disk 35, as shown in FIG. 1. In step 59, it is checked whether carriage (recording/reproduction head 10) 7 reaches the central position of the Nth track. If NO in step 59, minute adjustment is performed in step 61, and the flow returns to step 59. If YES in step 59, track position detector 37 discriminates this. When position detector 37 discriminates that the recording/reproduction head 10 has reached the central position of the Nth track, it supplies an interrupt signal to control section 17 via signal line 41. Upon reception of the interrupt signal, control section 17 stores the second position data (rotation angle of the pulse motor, or the number of pulses supplied to the pulse motor), which has been supplied to carriage driver 19, in storage section 15 (step 63).

By the above operation, physical originating point data of the recording/reproduction head of FDD main body 11 and central position data of the Nth track of disk 35 are stored.

In the above embodiment, physical originating-point data of the recording/reproduction head, and central position data of the Nth track of disk 35 has been stored. However, the present invention is not limited to the above embodiment. For example, a value obtained by subtracting the physical originating-point data from the central position data of the Nth track, may be stored. In other words, a value may be stored which is obtained by subtracting the rotation angle of the pulse motor when the recording/reproduction head reaches the physical originating-point, from the rotation angle of the pulse motor when the recording/reproduction head reaches the central position of the Nth track. Alternatively, a value may be stored which is obtained by subtracting the number of pulses having been supplied to the pulse motor until the recording/reproduction head reaches the physical originating-point, from the number of pulses having been supplied to the pulse motor until the recording/reproduction head reaches the central position of the Nth track.

After position adjustment, disk 35 and position detector 37 are unloaded from FDD main body 11. A recording disk (not shown) is then loaded to FDD main body 11 and is used.

A case wherein the FDD is used in a usual manner will be described with reference to the flow chart of FIG. 6. When the leading edge of a power source current is detected in step 71, control section 17 instructs carriage driver 19 to move carriage 21 to the originating-point detecting stopper in step 73. When it is detected in step 75 that carriage 21 has reached the detecting stopper, control section 17 reads out first and second position data from storage section 15 in step 77, and the first position data is subtracted from the second position data in step 79. Furthermore, in step 81 the following calculation is performed to move the carriage to a specified track.

{Second position data (the number of pulses) − First position data (the number of pulses)} − {|Ntrack−specified track| × pulses/track} . . .   (1)

By calculating the equation (1), the number of pulses to be supplied to the pulse motor in order to move the carriage to the specified track, can be obtained. For example, assume that the first position is the physical originating-point and the number of pulses which has been supplied to carriage driver 19 to move carriage 21 to the physical originating-point was 10 pulses. Similarly, assume that the second position is 40th track and the number of pulses which have been supplied to carriage driver 19 to move carriage 21 to the 40th track was 5000 pulses. As a result, the calculation of {second position data (the number of pulses)−first position data (the number of pulses)} is performed and 5000−10=4990 is obtained. Furthermore, the subtraction of a specified track (for example, 0 track) from Nth track (in this example, second position, i.e., 40th track) is performed. Note that the number of pulses required for moving carriage 21 by one track is fixed to 100 pulses, for example. Accordingly, the calculation of |40 tracks−0 track|×100 pulses/track is performed, and "4000" is obtained. Finally, 4990−4000=990 is obtained. Therefore, the recording/reproduction head of carriage 21 can be accurately positioned on track 0 from the physical originating-point by supplying 990 pulses to carriage driver 19. Notice that the rotation angle of the pulse motor and the number of pulses to be supplied thereto has a definite relation. (For example, 100 pulses are supplied to the pulse motor in order to obtain one rotation thereof.) Accordingly, the rotation angle of the pulse motor at the first position is subtracted from the rotation angle of the pulse motor at the second position. Then, the number of pulses can be calculated from the subtraction result. Then, the calculated number of pulses is applied to equation (1) to obtain the number of pulses to be supplied to the pulse motor in order to move the carriage to the specified track.

The calculation result obtained in step 81 is supplied to driver 19 to move carriage 21 to the specified track, in step 83.

As a result, the recording/reproduction head can be positioned correctly, from the physical originating-point to the central point of the specified track without causing an error.

With this arrangement, when the power source of FDD main body 11 is turned on, carriage 21 is moved to reach its physical originating point, and thereafter moved to a specified track on the recording disk, thereby performing correct positioning According to this embodiment, since control section 17 performs positioning of the recording/reproduction head 10 in accordance with the position data of the carriage at the physical originating-point, the position data (the rotation angle or the number of pulses to be supplied thereto) of the Nth track on the recording disk, the rotation angle of the motor of carriage driver 19, and the shift amount of the carriage, the entire assembly of carriage 21 need not be moved to and fixed at the central position of the Nth track indicated by adjustment disk 35.

According to this embodiment, in an error-retry procedure, a track offset instruction sent from a host computer can be handled, and FDD main body 11 can effectively serve even when off-tracking occurs.

Also, control section 17 can control the track position considering the correction in accordance with the characteristics of carriage driver 19.

In this embodiment, only the Nth track position data is obtained from adjustment disk 35. However, a plurality of track position data may be obtained from disk 35, so that the precision requirement of the mechanism of carriage 21 and so on can be lowered, thus facilitating manufacture.

Storage section 13 storing the adjustment program or track position detector 37 can be incorporated or provided outside FDD main body 11. When both are incorporated in FDD main body 11, automatic position adjustment of the recording/reproduction head can be performed only by loading adjustment disk 35 on FDD main body 11. When both are provided outside FDD main body 11, the arrangement of FDD main body 11 can be simplified.

The physical originating point of carriage 21 can be any position within a movable range of carriage 21.

In this embodiment, the present invention is applied to an FDD.

However, the present invention can be applied to any apparatus, such as a magnetic apparatus or an optical disk apparatus, which reads out data on a recording disk by using a movable head.

What is claimed is:

1. A method of controlling a head in a disk recording/reproducing apparatus, comprising the steps of:
   obtaining a first controlled variable supplied to a motor to move the head to a reference position;
   obtaining a second controlled variable supplied to the motor to move the head to an Nth track of an externally supplied adjustment disk wherein track positioning data is stored to be used for positioning the head;
   preliminarily storing the first and second controlled variables or the subtraction result of the first and second controlled variables in a memory;
   supplying to said motor a third controlled variable obtained based on the subtraction result of the first and second controlled variables, whereby said motor moves said head to a specified track on the disk.

2. A disk drive recording/reproduction assembly, comprising:
   a removable adjustment disk having at least N tracks;
   a recording disk installable at times when the adjustment disk is removed;
   recording/reproduction means for recording data on the recording disk and reproducing data from the recording disk, including a head, movable supporting means for supporting said head, moving means for moving said supporting means and head relative to the recording disk, and relative to the adjustment disk between a reference point and both a specified track of the recording disk, and the Nth track of said adjustment disk, and stopping means for stopping movement of said supporting means and head at a position corresponding to the reference point;
   first detecting means for detecting a position of said supporting means and head at the reference point;
   second detecting means for detecting a position of said supporting means and head at the Nth track of said adjustment disk;

storage means for storing a plurality of controlled variables, including at least a first and second controlled variable; and control means electrically connected to said recording/reproduction means, said first detecting means, said second detecting means and said storage means (i) for supplying signals to said moving means to move said supporting means and head to the reference point and the Nth track of said adjustment disk, (ii) for calculating said first controlled variable corresponding to the position of said supporting means and head at the reference point, (iii) for calculating said second controlled variable corresponding to the position of said head at the Nth track, (iv) for calculating a third controlled variable based on a subtraction result of said first and second controlled variables, and (v) for supplying a signal to said moving means to move said supporting means and head to a selected position on the recording disk intermediate the reference point and the specified track on the recording disk corresponding to said third controlled variable when the adjustment disk is removed and the recording disk is installed.

3. The assembly according to claim 2 wherein said second detecting means is detachably coupled to the assembly.

4. A disk drive recording/reproduction assembly, comprising:

a disk having at least N tracks;

recording/reproduction means for recording data on said disk and reproducing data from said disk, including a head, movable supporting means for supporting said head, moving means including a pulse motor for moving said supporting means and head relative to said disk between a reference point and the Nth track, and stopping means for stopping movement of said supporting means and head at a position corresponding to the reference point;

first detecting means for detecting a position of said supporting means and head at the reference point;

second detecting means for detecting a position of said supporting means and head at the Nth track of said disk, and for detecting a plurality of positions of said supporting means and head intermediate the reference point and the Nth track;

storage means for storing a plurality of controlled variables, including at least first and second pulses of said pulse motor; and control means electrically connected to said recording/reproduction means, said first detecting means, said second detecting means and said storage means (i) for supplying signals to said moving means to move said supporting means and head to the reference point and the Nth track, (ii) for calculating said first pulses corresponding to the position of said supporting means and head at the reference point, (iii) for calculating said second pulses corresponding to the position of said supporting means and head at the Nth track, (iv) for calculating third pulses based on a subtraction result of said first and second pulses, and (v) for supplying a signal to said moving means to move said supporting means and head to a selected position on the disk intermediate the reference point and the Nth track corresponding to said third pulses.

5. A disk drive recording/reproduction assembly, comprising:

a disk having at least N tracks;

recording/reproduction means for recording data on said disk and reproducing data from said disk, including a head, movable supporting means for supporting said head, moving means including a pulse motor for moving said supporting means and head relative to said disk between a reference point and the Nth track, and stopping means for stopping movement of said supporting means and head at a position corresponding to the reference point;

first detecting means for detecting a position of said supporting means and head at the reference point;

second detecting means for detecting a position of said supporting means and head at the Nth track of said disk, and for detecting a plurality of positions of said supporting means and head intermediate the reference point and the Nth track;

storage means for storing a plurality of controlled variables, including at least first and second rotation angles of said pulse motor; and control means electrically connected to said recording/reproduction means, said first detecting means, said second detecting means and said storage means (i) for supplying signals to said moving means to move said supporting means and head to the reference point and the Nth track, (ii) for calculating said first rotation angle corresponding to the position of said supporting means and head at the reference point, (iii) for calculating said second rotation angle corresponding to the position of said supporting means and head at the Nth track, (iv) for calculating a rotation angle based on a subtraction result of said first and second rotation angles, and (v) for supplying a signal to said moving means to move said supporting means and head to a selected position on the disk intermediate the reference point and the Nth track corresponding to said third rotation angle.

* * * * *